United States Patent [19]

Pakhomov et al.

[11] 3,728,442

[45] Apr. 17, 1973

[54] METHOD OF PRODUCING VANADIUM PENTOXIDE

[76] Inventors: Dmitry Afanasievich Pakhomov, ulitsa D. Bednogo, 58a, kv. 46; Stanislav Mikhailovich Arkhipov, ulitsa Koshurnikova, 12, kv. 81; Alexandr Egorovich Pruntsev, ulitsa D. Bednogo, 58, kv. 23; Semen Avramovich Milsky, ulitsa D. Bednogo, 58a, kv. 21; Alexei Petrovich Pleskachev, ulitsa D. Bednogo, 58, kv. 31, all of Novosibirsk, U.S.S.R.

[22] Filed: June 7, 1971

[21] Appl. No.: 150,791

[52] U.S. Cl. .................................................423/592
[51] Int. Cl. ...............................................C01g 31/00
[58] Field of Search......................23/19 V, 22, 23, 23/14 D; 423/592

[56] References Cited

UNITED STATES PATENTS

| | | | |
|---|---|---|---|
| 3,472,612 | 10/1969 | Michal | 23/140 X |
| 2,442,610 | 6/1948 | Meister | 23/140 |
| 2,784,075 | 3/1957 | Bauerle et al | 23/19 V |
| 2,357,466 | 9/1944 | Frick | 23/19 V |

*Primary Examiner*—Herbert T. Carter
*Attorney*—Waters, Roditi, Schwartz & Nissen

[57] ABSTRACT

A method of producing vanadium pentoxide, characterized in that ammonium vanadate is treated with a 2.0 – 2.5 N. mineral acid at a $H^+/VO_3^-$ ratio $= 1.0 - 1.1$ g-equiv. The resultant vanadium acid precipitate is separated from the mother liquor, washed with water to the pH value of the washings equal to 4 – 5 and calcined at a temperature of 500° – 600° C.

The proposed method makes possible the production of a granulated dustless final product of a high degree of purity.

6 Claims, No Drawings

METHOD OF PRODUCING VANADIUM PENTOXIDE

The present invention relates to methods of producing vanadium pentoxide, which may be used in metallurgy, mainly for preparing alloys, such as vanadium-aluminum ligatures, and metallic vanadium.

Known in the art is a method of producing vanadium pentoxide by treating an aqueous solution of ammonium vanadate with a mineral acid at a temperature of 60°-95 C till the pH value of the solution becomes 1 - 2. The time of acid treatment lasts from several minutes to several hours. The precipitate of ammonium polyvanadate is dried and calcined at a temperature of 650° C and vanadium pentoxide in the form of a dusty powder is obtained.

The disadvantage of the known method is that vanadium pentoxide is formed as a powder which can be explained by the presence of ammonium ions in the polyvanadate precipitates to be to calcined. Considerable losses of vanadium pentoxide powder take place with subsequent processing of the said product.

Also known in the art is a method of producing granulated dustless vanadium pentoxide consisting in that powder-like vanadium pentoxide is mixed with water and the resultant paste is compacted by pressing or briquetting. The briquettes are then dried and calcined (cf. U.S. Pat. No. 3,239,300).

Said method makes possible the production of vanadium pentoxide which is resistant to impact and attrition. However, said method requires the use of finely dispersed dusty vanadium pentoxide powder and is associated with considerable expenditures on equipment.

The object of the present invention is to provide a method which would permit the obtaining of the desired product, that is, vanadium pentoxide, in a granulated and dustless form.

In accordance with the said and other objects, the method of the invention comprises treatment of ammonium vanadate with a mineral acid at a temperature of 70°-95° C during 10 - 20 minutes.

In accordance with the invention, ammonium vanadate is treated with a 2.0 - 2.5 N mineral acid with the ratio $H^+/VO_3^- = 1.0 - 1.1$ g-equiv., the hydrolysis products being vanadium acid and the ammonium salt of the mineral acid. The vanadium acid precipitate is separated from the mother liquor containing said ammonium salt and excess mineral acid. Then the said precipitate is washed with water until the pH value of the washings equals to 4 - 5 and calcined at a temperature of 500°-600° C.

The proposed method permits a granulated dustless final product of high purity to be produced.

It should be specially emphasized that only strict observance of said process conditions in the production of the intermediate vanadium acid ensures, with its subsequent calcining, the obtaining of strong granules of vanadium pentoxide. Under other conditions either ammonium polyvanadates are obtained, which, during calcining give vanadium pentoxide powder, or vanadium acid in the form of a colloidal non-filtering precipitate which is very difficult to separate from the mother liquor containing ammonium salts.

It is advisable to dry the vanadium acid precipitate at a temperature of 200°-300° C prior to calcining thereof.

For treating ammonium vanadate with a mineral acid it is possible first to prepare an aqueous acid solution at a temperature of 70°-95° C and then to add ammonium vanadate at said temperature. Or, it is possible to first prepare an aqueous suspension of ammonium vanadate at a temperature of 70°-95° C and then a concentrated mineral acid can be added thereto at said temperature.

For a better preservation of the vanadium acid structure, the vanadium acid precipitate, before washing thereof with water, should be washed with a 0.20 - 0.50 percent aqueous solution of a mineral acid.

Depending on whether a mineral acid solution or ammonium vanadate suspension is prepared first, the washings resulting after the washing of the vanadium acid precipitate with water, are used for preparing either a mineral acid solution or an ammonium vanadate suspension.

In the method proposed herein it is possible to use ammonium vanadate produced by treating an aqueous solution of an alkali metal vanadate having a concentration of 70 - 150 g/l as calculated for vanadium pentoxide with an aqueous solution of a mineral acid ammonium salt having a concentration of 70 - 100 g/l as calculated for ammonia at a temperature of 5°-25° C, followed by separation of the ammonium vanadate precipitate from the solution and washing it with water.

If ammonium vanadate is synthesized by the above method, it is advisable that for a more effective use of the reagents, the above-mentioned mother liquor, after the separation of the vanadium acid precipitate, should be neutralized with ammonium cabronate and the resultant aqueous solution of the ammonium salt of the mineral acid should be used for preparing the above-said aqueous solution of the mineral acid ammonium salt (i.e., the solution which is used for producing ammonium vanadate).

It is advisable for the same purpose of a more effective use of the reagents, that the washings resulting after washing the vanadium acid precipitate with the aqueous solution of the mineral acid should be mixed with the said mother liquor prior to neutralizing with ammonium carbonate.

The proposed method of producing vanadium pentoxide is carried out as follows.

Ammonium vanadate is subjected to treatment with a mineral acid. For carrying out said acid treatment it is possible first to prepare at a temperature of 70°-95° C an aqueous suspension of ammonium vanadate with S/L ratio =3-4, and then add to the obtained suspension at said temperature and under stirring a concentrated mineral acid in a ratio of 1.0 - 1.1 g-equiv. per g-equiv. of ammonium vanadate. Besides, for carrying out said acid treatment, it is also possible first to prepare at a temperature of 70°-95° C a 2.0 - 2.5 N aqueous solution of mineral acid and then charge ammonium vanadate thereinto at said temperature and under continuous stirring, at a ratio of 1 g-equiv. per 1.0 - 1.1 g-equiv. of mineral acid. In the first and in the second case the resultant mixture of the reagents is kept for 10 - 20 minutes at a temperature of 70°-95° C under continuous stirring. The resulting red-brown vanadium acid precipitate is separated from the mother liquor, e.g., by filtering. The vanadium acid precipitate should not contain ammonium salts and for this reason it is washed with water until the pH value of the washings equals 4 – 5 (one-step washing). The washing time should not exceed 2.5 – 3 hours. Otherwise a difficult-to-filter precipitate with a large moisture content will originate.

For a better preservation of the vanadium acid structure, it is advisable that the washing of the vanadium acid precipitate should be effected in two steps. In the first step a 0.20 – 0.50 percent aqueous mineral acid solution is used and in the second step water is used to wash the precipitate until the pH value of the washings equals to 4 – 5.

The washed vanadium acid precipitate is either calcined at a temperature of 500°–600° C or first dried at a temperature of 200°– 300° C and then calcined at a temperature of 500°–600° C.

The vanadium pentoxide produced by the proposed method has the form of granules 0.5 – 20 mm in size, it is resistant to impact and attrition, is dustless. The content of admixtures in it does not exceed that permissible for a reactive grade. Purity of the produced vanadium pentoxide is more than 99.0 percent.

In the proposed method, as pointed out above, the mother liquor resulting after the separation of the vanadium acid precipitate and the washings remaining after washing the said precipitate may be returned to the process, thus solving the problem of their utilization and increasing the effectiveness of using the reagents.

For a better understanding of the present invention given hereinbelow are the following illustrative examples of producing vanadium pentoxide.

Example 1

117 g of ammonium vanadate were charged into 400 ml of water at a temperature of 80° C. Into the resultant suspension under stirring 115 ml of concentrated hydrochloric acid with a specific gravity of 1.15 were added, after which the reaction mixture was stirred for another 10 minutes at said temperature and then filtered. The mother liquor (330 ml) contained 0.65 percent of $V_2O_5$, 10.2 percent of $NH_4Cl$ and 1.2 percent of HCl. The vanadium acid precipitate was washed on a filter with 400 ml of distilled water muntil the pH of the washings was equal to 5. The washings contained 0.1 percent of $V_2O_5$, 1.8 percent of $NH_4Cl$ and 0.13 percent of HCl.

The washed vanadium acid precipitate was calcined at a temperature of 600° C during 2 hours.

The resultant product had the following granulometric composition: more than 5 mm fraction, 46 percent; from 3 to 5 mm fraction, 37 percent; from 1 to 3 mm fraction, 15 percent, less than 1 mm fraction, 2 percent.

The content of admixtures in the finished product: sulphates, 0.02 percent; chlorides, 0.01 percent, ammonium salts, 0.015 percent; sodium, potassium, calcium, 0.025 percent; heavy metals of $H_2S$ group, 0.001 percent; substances insoluble in hydrochloric acid (including $SiO_2$), 0.09 percent.

Example 2

32.5 g of ammonium vanadate were charged into 0.13 l of water at a temperature of 75° C. Into the resultant suspension under stirring 29 ml of hydrochloric acid with a specific gravity of 1.177 were added, after which the reaction mixture was stirred for another 10 minutes at said temperature. The resulting vanadium acid precipitate was separated from the mother liquor by filtering, followed by washings on a filter in two steps: first with 0.05 l of 0.3 percent hydrochloric acid solution and then with the same quantity of distilled water until the pH value of the washings was equal to 4 – 5. The washed vanadium acid precipitate in a quantity of ≈100 g was calcined at a temperature of 500° C for 3.5 hours. 23.5 g of granulated vanadium pentoxide with characteristics as set forth in the Example 1 were obtained.

The mother liquor obtained after separation of the vanadium acid precipitate contained 6.2 g/l of $V_2O_5$ and 7.8 g/l of HCl. The washings after washing said precipitate with 0.3 percent hydrochloric acid solution contained 4.27 g/l of $V_2O_5$ and 6 g/l of HCl and the washings after the second washing step contained 0.9 g/l of $V_2O_5$ and 1.2 g/l of HCl.

Example 3

210 g of demineralized water and 65.3 l of hydrochloric acid with specific a gravity of 1.177 were poured into a reactor equipped with a stirrer and a steam jacket. The acid solution was heated to 85° C and 64.6 kg of ammonium vanadate were charged into it during 2 minutes under stirring. The reactor contents were stirred at a temperature of 80°–85° C for 15 minutes and then discharged on a nutsche filter during a periof of 2 – 3 minutes. Immedeately after filtering the mother liquor the vanadium acid precipitate was washed first with about 120 l of 0.3 percent hydrochloric acid solution and then with 100 l of demineralized water pouring it on the precipitate and filtering it in 2 – 3 steps. The washings acidity by the end of washing corresponded to $pH = 4$. The filtering of the mother liquor and washing of the vanadium acid precipitate took about 20 minutes and 2.5 hours, respectively.

The washed vanadium acid precipitate was dried in a hearth furnace at a temperature of 250° C for 1 hour and then calcined at a temperature of 600° C for 2 hours (without stirring). 48.2 kg of granulated vanadium pentoxide was produced.

The mother liquor (154 l) obtained after the separation of the vanadium acid precipitate contained 7.3 g/l of $V_2O_5$, 9.3 g/l of HCl and 112 g/l of $NH_4Cl$. Washing waters from all the washings (≈230 l) contained 1.06 g/l of $V_2O_5$, 4.5 g/l of HCl and 47.8 g/l of $NH_4Cl$.

Example 4

1.04 l of an aqueous solution of ammonium chloride with a concentration of ≈260 g/l of $NH_4Cl$ were added to 2 liters of an aqueous solution of sodium vanadate. The mixture was stirred at a temperature of 18°–20° C for 1 hour and then filtered. The resultant mother liquor (2.76 lit) containing 0.36 g/l of $V_2O_5$ was removed from the process. The formed ammonium vanadate precipitate was washed on a filter with 0.8 lit. of cold water. 0.88 liter of washings containing 0.5 – 0.6 g/l of $V_2O_5$ and about 250 g of wet ammonium vanadate precipitate were produced.

150 g of the wet ammonium vanadate precipitate (≈120 g of dry $NH_4VO_3$) were charged into 0.5 lit. of water at a temperature of 80°–85° C. Into the resultant suspension under continuous stirring 100 ml of concentrated hydrochloric acid with a specific gravity of 1.177 were added, after which the reaction mixture was stirred for another 15 minutes at said temperature. The resulting red-brown vanadium acid precipitate was filtered and washed with 0.56 lit. of 0.25 percent hydrochloric acid solution and then with 0.5 lit. of water until the pH of the washings was equal to 4. The washed vanadium acid precipitate in the amount of ≈350 g was calcined at a temperature of 550° C during 2.5 hours. 86 g of vanadium pentoxide were obtained in the form of strong granules with the main fraction of more than 5 mm (≈50 percent) and a small quantity of fractions less than 1 mm (≈2 percent).

The mother liquor (0.4 lit.) resulting after the separation of the vanadium acid precipitate contained 6.8 g/l of $V_2O_5$, 10 g/l of HCl and 95 g/l of $NH_4Cl$. The washings (0.55 liter) after the washing of said precipitate with 0.25 percent hydrochloric acid solution contained 6.37 g/l of $V_2O_5$, and the washings (0.5 liter) after the second step of washing the precipitate contained 1.0 g/l of $V_2O_5$. ater was added and 220 g more of ammonium chloride were dissolved in it. There were obtained 1.04 lit. of an aqueous solution of ammonium chloride 110  260 g/l of $NH_4Cl$) which was returned to the initial stop of the process, i.e., for treating the aqueous solution of sodium vanadate.

Example 5 ≈92

1.04 liter of ammonium chloride aqueous solution with a concentration of ≈260 g/l of $NH_4Cl$ was added to 1.16 liter of potassium vanadate aqueous solution containing 140 g/l of $V_2O_5$ and 15 g/l of KOH. The mixture was stirred for 1 hour at a temperature of 18°–20C and then filtered. The resultant mother liquor ( 2.80 liters) containing 0.6 g/l of $V_2O_5$ was removed from the process. The ammonium vanadate precipitate was washed on a filter with 1 liter of cold water. 0.97 liter of wash water containing 0.5 – 0.6 g/l of $V_2O_5$ and about 250 g of wet ammonium vanadate precipitate were obtained.

148 g of the wet ammonium vanadate precipitate (≈117 g of dry $NH_4VO_3$) were charged into 0.4 liter of water at a temperature of 80° C. To the resultant suspension, under stirring 115 ml of hydrochloric acid with a specific weight of 1.15 was added, after which the reaction mixture was stirred for 10 minutes at said temperature and then filtered. The mother liquor (0.33 liter) contained 0.65 percent of $V_2O_5$, 1.2 percent of HCl and 10.2 percent of $NH_4Cl$.

The vanadium acid precipitate was washed on a filter with 0.4 liter of distilled water until the pH of the washings was equal to 4. The wash water contained 0.1 percent of $V_2O_5$, 0.15 percent of HCl and 1.8 percent of $NH_4Cl$.

The washed vanadium acid precipitate was calcined at a temperature of 600° C for 2 hours. The resultant final product had the following granulometric composition: fraction more than 5 mm, 46 percent; fraction from 3 to 5 mm, 37 percent; fraction from 1 to 3 mm, 15 percent; fraction less than 1 mm, 2 percent.

The content of admixtures in the finished product: sulfates, 0.02 percent; chlorides, 0.01 percent; ammonium salts, 0.015 percent; sodium, potassium, calcium, 0.025 percent; heavy metals of $H_2S$ group, 0.001 percent; elements insoluble in hydrochloric acid (including $SiO_2$), 0.09 percent.

Said washings after the washing of vanadium acid precipitate were used for preparing the above said ammonium vanadate suspension. For this purpose 0.4 liter of the washings was heated to a temperature of 80° C and 148 g of wet ammonium vanadate precipitate (≈117 g of dry $NH_4VO_3$) was placed into it.

Example 6

0.32 liter of ammonium nitrate aqueous solution with a concentration of ≈450 g/l of $NH_4NO_3$ was added to 1.2 liter of sodium vanadate aqueous solution containing 101 g/l of $V_2O_5$ and 15 g/l of NaOH. The mixture was stirred at a temperature of 10° – 15° C for 1 hour and then filtered. Ammonium vanadate precipitate separated from the mother liquor was washed with cold water.

157 g of wet ammonium vanadate precipitate (≈117 g of dry $NH_4VO_3$) was placed into 0.4 liter of water at a temperature of 80° C. Into the resultant suspension 77.5 ml of nitric acid with a specific weight of 1.34 was added under continuous stirring after which the suspension was stirred at said temperature for 10 minutes and then filtered. The red-brown vanadium acid precipitate was separated from the motor liquor and washed on a filter first with 0.3 liter of 0.3 percent nitric acid solution and then with distilled water till the pH value of the washings was equal to 4. The washed vanadium acid precipitate was dried at a temperature of 300° C for 1 hour and then calcined at a temperature of 550° C for 2.5 hours. The final product obtained had the following granulometric composition: more than 5 mm fraction, 39 percent; from 3 to 5 mm fraction, 47 percent; from 1 to 3 mm fraction, 12.5 percent; less than 1 mm fraction, 1.5 percent.

The content of admixtures in the product: sulfates, 0.02 percent; chlorides, 0.001 percent; nitrates, 0.005 percent; ammonium salts, 0.01 percent; sodium, potassium, calcium, 0.03 percent; heavy metals of $H_2S$ group, 0.001 percent;, elements insoluble in hydrochloric acid (including $SiO_2$), 0.08 percent.

The mother liquor (0.32 liter) obtained after the separation of vanadium acid precipitate contained 0.7 percent of $V_2O_5$, 2 percent of $HNO_3$ and 15.8 percent of $NH_4NO_3$. The washings after the washing of said precipitate with 0.3 percent nitric solution contained 0.12 percent of $V_2O_5$, 0.21 percent of $HNO_3$ and 1.9 percent of $NH_4NO_3$, and the washings after the second washing step contained 0.65 percent of $V_2O_5$, 1.5 percent of $HNO_3$ and 9.8 percent of $NH_4NO_3$.

Example 7

1.04 liter of ammonium chloride aqueous solution with a concentration of ≈260 g/l of $NH_4Cl$ was added to 2 liters of sodium vanadate aqueous solution containing 81 g/l of $V_2O_5$ and 6 g/l of NaOH. The mixture was stirred at a temperature of 18° – 20° C for 1 hour and then filtered. The ammonium vanadate precipitate separated from the mother liquor was washed on a filter with 0.8 liter of cold water. 0.88 liter of washings were obtained containing 0.5 – 0.6 g/l of $V_2O_5$ and about 250 g of wet ammonium vanadate precipitate.

115 ml of hydrochloric acid with a specific weight of 1.15 was added, while stirring to 0.4 liter of water at a temperature of 75° – 80°C, after which into the resultant solution at said temperature and under stirring 148 g of wet ammonium vanadate precipitate ($\approx$117 g of dry $NH_4VO_3$) was placed. The reaction mixture was stirred for 12 minutes at a temperature of 75° – 80° C after which it was filtered. The mother liquor (0.33 liter) contained 0.65 percent of $V_2O_5$, 1.2 percent of HCl and 10.2 percent of $NH_4Cl$. The vanadium acid precipitate was washed on a filter with 0.25 liter of 0.2 percent hydrochloric acid solution and then with 0.4 liter of distilled water till the pH of the washings was equal to 4. The washed vanadium acid precipitate was calcined at a temperature of 600° C for 2 hours. Vanadium pentoxide was produced, its granulometric composition and admixtures content corresponding to the vanadium pentoxide as produced in the Example 5.

The washings (0.25 liter) after the washing of the precipitate with 0.2 percent hydrochloric acid solution contained 0.6 percent of $V_2O_5$, 1 percent of HCl and 7.1 percent of $NH_4Cl$. The washings (0.4 liter) after the second washing step contained 0.1 percent of $V_2O_5$, 0.15 percent of HCl and 1.8 percent of $NH_4Cl$.

The mother liquor obtained after the separation of the vanadium acid precipitate was mixed with water from the first washing step of said precipitate, and 0.58 liter of a solution was obtained containing 0.63 percent of $V_2O_5$, 1.1 percent of HCl and 8.87 percent of $NH_4Cl$. The resultant solution was neutralized with 8.4 g of ammonium carbonate and then 0.4 liter of water was added and 163 g of ammonium chloride were dissolved therein. 1.04 liter of ammonium chloride aqueous solution ($\approx$160 g/l of $NH_4Cl$) was produced which returned to the initial stage of the process, i.e., treating the aqueous solution of sodium vanadate.

The washings from the second washing step of the vanadium acid precipitate were used for preparing the above said aqueous solution of hydrochloric acid with a specific gravity of 1.15. For this purpose 0.4 liter of the washings was heated to 75° – 80° C and 114 ml of said acid were added thereto with stirring.

What we claim is:

1. A method of producing vanadium pentoxide comprising reacting ammonium vanadate with a 2.0 – 2.5 N solution of hydrochloric or nitric acid in a ratio $H^+$: $VO_3^- = 1.0$–$1.0$ g-ion at a temperature of 70°–95° C., intermixing the reaction mixture for 10–20 minutes at said temperature, immediately filtering the resulting precipitate of vanadic acid, washing the precipitate with water until the pH of the wash water is 4–5, and calcining the washed precipitate at a temperature of 500°–600° C. to form $V_2O_5$ in the form of strong granules measuring 0.5 to 20 mm.

2. A method as claimed in claim 1 wherein the precipitate is washed with a 0.2 – 0.5 per cent solution of hydrochloric or nitric acid prior to washing with water.

3. A method as claimed in claim 1 wherein the precipitate is dried at a temperature of up to 300° C. prior to calcination.

4. A method as claimed in claim 1 wherein the reaction mixture of ammonium vanadate and 2.0 – 2.5 N solution of hydrochloric or nitric acid is formed by adding concentrated hydrochloric or nitric acid to an aqueous suspension of ammonium vanadate.

5. A method as claimed in claim 1 wherein the initial reaction mixture is prepared using recycled wash water from the washing of the vanadic acid precipitate.

6. A method as claimed in claim 2 wherein the ammonium vanadate is prepared by treating an aqueous solution of an alkali metal vanadate with the recycled mother liquor from the precipitation of vanadic acid and the recycled wash solution of 0.2 – 0.5 per cent hydrochloric or nitric acid, said mother liquor and wash solution having been previously neutralized with ammonium carbonate.

* * * * *